US009092536B2

(12) United States Patent
Rogers et al.

(10) Patent No.: US 9,092,536 B2
(45) Date of Patent: Jul. 28, 2015

(54) ENABLING PSEUDO-CLASS STYLES WITHOUT REVEALING PERSONAL INFORMATION

(75) Inventors: Justin Rogers, Redmond, WA (US); Markus Mielke, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 283 days.

(21) Appl. No.: 13/079,308

(22) Filed: Apr. 4, 2011

(65) Prior Publication Data

US 2011/0179349 A1    Jul. 21, 2011

Related U.S. Application Data

(62) Division of application No. 11/877,685, filed on Oct. 24, 2007, now Pat. No. 7,949,934.

(51) Int. Cl.
G06F 17/00 (2006.01)
G06F 17/30 (2006.01)

(52) U.S. Cl.
CPC ................. G06F 17/3089 (2013.01)

(58) Field of Classification Search
CPC .................................. G06F 17/2247
USPC ......................................... 715/204
See application file for complete search history.

(56) References Cited

U.S. PATENT DOCUMENTS

| 6,023,714 A * | 2/2000 | Hill et al. ................... 715/235 |
| 6,327,574 B1 | 12/2001 | Kramer |
| 6,585,778 B1 | 7/2003 | Hind et al. |
| 6,931,532 B1 | 8/2005 | Davis et al. |
| 7,054,614 B1 * | 5/2006 | Hunzinger .................. 455/411 |
| 7,219,139 B2 | 5/2007 | Martin |
| 7,627,814 B1 | 12/2009 | Soldan et al. |
| 7,949,934 B2 | 5/2011 | Rogers |
| 8,543,668 B1 * | 9/2013 | Long ............................ 709/219 |
| 2003/0037021 A1 * | 2/2003 | Krothappalli et al. ........... 707/1 |
| 2004/0133855 A1 * | 7/2004 | Blair et al. .................... 715/517 |
| 2006/0004772 A1 | 1/2006 | Hagan |
| 2006/0031763 A1 | 2/2006 | Yeung |
| 2006/0143688 A1 | 6/2006 | Futoransky |
| 2007/0300151 A1 * | 12/2007 | Araki et al. .................. 715/513 |
| 2008/0270802 A1 | 10/2008 | Ashley et al. |
| 2009/0113280 A1 | 4/2009 | Rogers |
| 2010/0169177 A1 * | 7/2010 | Griffith et al. ............. 705/14.53 |

OTHER PUBLICATIONS

"Non-Final Office Action", U.S. Appl. No. 11/877,685, (Oct. 1, 2010), 13 pages.

(Continued)

*Primary Examiner* — Scott Baderman
*Assistant Examiner* — Mustafa Amin
(74) *Attorney, Agent, or Firm* — John Jardine; Kate Drakos; Micky Minhas

(57) ABSTRACT

Various embodiments enable particular CSS pseudo-classes to be employed, but limit particular functionality aspects of those pseudo-classes that can lead to divulging personally identifiable information. Thus, various embodiments can change how a CSS pseudo-class is allowed to function. For example, in at least some embodiments, CSS pseudo-classes are permitted to be used to make the visual formatting changes to a web page, but not structural formatting changes. That is, changes that do not affect the structure of content within a web document are allowed, while changes that affect the structure of the content are not allowed.

19 Claims, 4 Drawing Sheets

(56) References Cited

OTHER PUBLICATIONS

"Notice of Allowance", U.S. Appl. No. 11/877,685, (Feb. 16, 2011),13 pages.

"Timing Attacks on Web Privacy", *SecuriTeam*, retrieved from <http://www.securiteam.com/securityreviews/5GP020A6LG.html> on Aug. 23, 2007,(Feb. 20, 2002),2 pages.

Baron, David et al., "Bug 14777—:visited support allows queries into global history", https://bugzilla.mozilla.org/show_bug.cgi?id=147777, (May 28, 2002-Jan. 31, 2011),68 pages.

Bos, Bert et al., "Cascading Style Sheets Level 2 Revision 1 (CSS 2.1) Specification", *W3C*, (Jul. 19, 2007),pp. 1-405.

Jackson, Collin et al., "Protecting Browser State from Web Privacy Attacks", *In Proceedings of WWW 2006*, May 23-26, 2006, (May 23, 2006),pp. 737-744.

Jakobsson, Markus et al., "Invasive Browser Sniffing and Countermeasures", *In Proceedings of WWW 2006*, May 23-26, 2006, available at <http://delivery.acm.org/10.1145/1140000/1135854/p523-jakobsson.pdf?key1=1135854&key2=2854577811&coll=GUIDE&dl=GUIDE&CFID=32474453&CFTOKEN=95156071>,(May 23, 2006),pp. 523-532.

Louw, Mike T., et al., "Extensible Web Browser Security", *Department of Computer Science, University of Illinois at Chicago; in Notice of Allowance on Feb. 16, 2011*, available at <http://cs.uic.edu/~venkat/research/papers/extensib>,20 pages.

Sullivan, Nick "Revealing Web History Without JavaScript", retrieved from <http://www.symantec.com/enterprise/security_response/weblog/2007/04/css_history.html> on Aug. 23, 2007,(Apr. 6, 2007),1 page.

Syverson, Paul F., et al., "Private Web Browsing", *Naval Research Laboratory*, available at <http://www.windowsecurity.com/uplarticle/13/JCS-1997.pdf>,(Jun. 2, 1997),pp. 1-13.

Bortz, et al., "Exposing Private Information by Timing Web Applications", *In Proceedings of the 16th International Conference on World Wide Web*, (May 8, 2007), 8 pages.

Chandrasekaran, et al., "Phishing E-mail Detection Based on Structural Properties", *In Academic Track of the 9th Annual NYS Cybersecurity Conference*, (Jun. 2006), 7 pages.

\* cited by examiner

ENABLING PSEUDO-CLASS STYLES WITHOUT REVEALING PERSONAL INFORMATION

RELATED APPLICATION

This application is a divisional of and claims priority to U.S. patent application Ser. No. 11/877,685 filed Oct. 24, 2007 entitled "Enabling Pseudo-Class Styles Without Revealing Personal Information" to Rogers et al., the disclosure of which is incorporated by reference herein in its entirety.

BACKGROUND

Cascading Style Sheets (CSS) provide a simple mechanism for adding style (e.g., fonts, colors, and spacing) to web documents. CSS's standard, entitled "Cascading Style Sheets Level 2 Revision 1 (CSS 2.1) Specification, W3C Candidate Recommendation 19 Jul. 2007", contains definitions for pseudo-class styles or selectors that apply to elements when the elements are in a particular state or condition. For example, the pseudo-class ":link" applies to links that have not been visited and the pseudo-class ":visited" applies to links that have been visited.

So, for example, the pseudo-class ":link" can be used to add style to a link that has not been visited such as by coloring the link or changing the link's font in a particular way. The pseudo-class ":visited" can be used to add style to a link that has been visited, such as by coloring the link or changing the link's font in a particular way. The ":visited" pseudo-class draws upon historical information about a user's past browsing activities in order to enable styles to be added to a particular link.

One of the problems associated with pseudo-classes and in particular, those mentioned above, pertains to user information (referred to herein as "personally identifiable information") that can be collected regarding operations surrounding use of the pseudo-classes. A user's past browsing activities constitutes one type of personally identifiable information. Because this collected information is personal in nature, it can form the basis for some type of attack aimed at a particular user. For example, collected information about which sites a user has visited might be used to deliver a user experience which is specifically targeted to the user's browsing history. This, in turn, can increase the potential that the user will respond to the attack in a way that the attacker desires.

Personally identifiable information can be gathered in a number of ways. The information might be gleaned by script which is designed to read information about applied styles off of an element in question. For example, script might attempt to read formatting information that describes whether a user has visited a particular site or has taken a particular type of action. Alternately or additionally, personally identifiable information might be inferred by examining HTTP traffic related to style processing that results in image requests made to a remote source. That is, by clicking on a particular link, a user's web browser might responsively generate an HTTP request for a remotely located image. When a server receives the HTTP request, it can infer from the request that the user has visited a particular link. Alternately or additionally, personally identifiable information might be gathered by ascertaining whether complex formatting has taken place that affects the layout of surrounding elements within a page. That is, a user may take some action that causes surrounding structure of a web page to be modified in some way. Based on the structural modification, one can infer that a user has taken the action, such as clicking on a link. Further, personally identifiable information might be gathered by examining differences in code path times. For example, assume that a web browser has a particular code path that executes synchronously or even asynchronously and has a detectable end state, such as a completion callback. If a mitigation were to be added to not check a user's browsing history, then the time it takes to perform this operation would be significantly less than a path which checks the user's browsing history. By detecting the timing differences, an attacker can infer which code path was run.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable particular CSS pseudo-classes to be employed, but limit particular functionality aspects of those pseudo-classes that can lead to divulging personally identifiable information. Thus, various embodiments can change how a CSS pseudo-class is allowed to function. For example, in at least some embodiments, CSS pseudo-classes are permitted to be used to make the visual formatting changes to a web page, but not structural formatting changes. That is, changes that do not affect the structure of content within a web document are allowed, while changes that affect the structure of the content are not allowed.

BRIEF DESCRIPTION OF THE DRAWINGS

The same numbers are used throughout the drawings to reference like features.

DETAILED DESCRIPTION

Overview

Various embodiments enable particular CSS pseudo-classes to be employed, but limit particular functionality aspects of those pseudo-classes that can lead to divulging personally identifiable information. Thus, various embodiments can change how a CSS pseudo-class is allowed to function. For example, in at least some embodiments, CSS pseudo-classes are permitted to be used to make the visual formatting changes to a web page, but not structural formatting changes. That is, changes that do not affect the structure of content within a web document are allowed, while changes that affect the structure of the content are not allowed.

In at least some embodiments, a Web browser includes, or otherwise makes use of a mitigation component that is designed to enable certain uses of CSS pseudo-classes while, at the same time, protect against revealing personally identifiable information by limiting those uses.

In the discussion that follows, a section entitled "Operating Environment" is provided and describes one environment in which one or more embodiments can be employed. Following this, a section entitled "Example Mitigation Component" is provided and describes but one example of a mitigation component in accordance with one or more embodiments. Following this, a section entitled "Example Methods" is provided and describes example methods in accordance with one or more embodiments. Last, a section entitled "Example System" is provided and describes an example system that can be utilized to implement one or more embodiments.

Operating Environment

Figure 1:
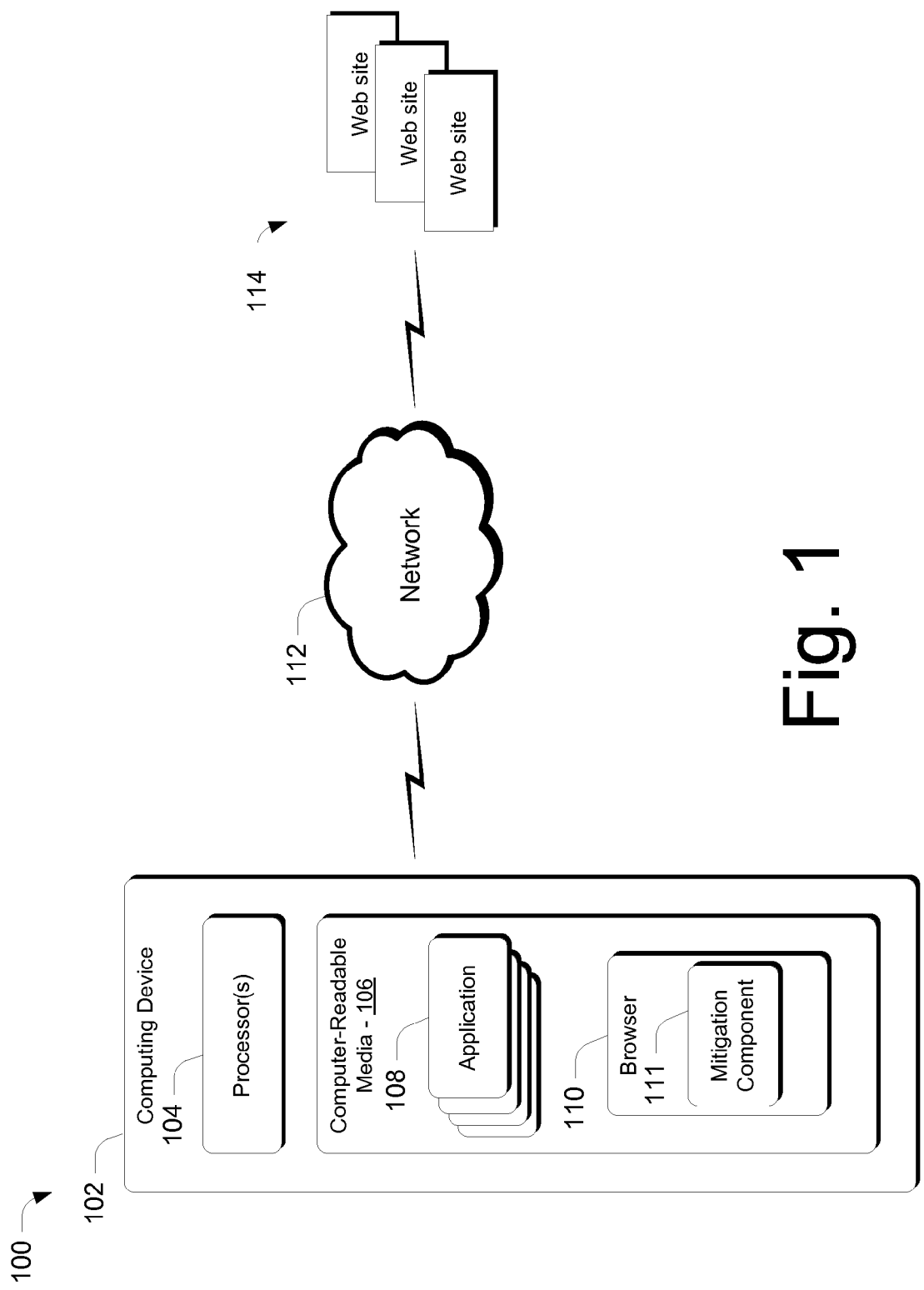
FIG. 1 illustrates a system in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 5.

In addition, computing device 102 includes a software application in the form of a web browser 110. Any suitable web browser can be used examples of which are available from the assignee of this document and others. In at least some embodiments, web browser 110 includes or otherwise makes use of a mitigation component 111 that is configured to enable particular CSS pseudo-classes to be employed in a limited capacity that is designed to protect personally identifiable information.

It is to be appreciated and understood, however, that the embodiments described in this document can be utilized with applications other than web browsers. Accordingly, any application that can process web documents or associated elements in the manner described in this document can be utilized. For example, any applications that utilize or process any markup-enabled language that uses pseudo-class enabled styling can be vulnerable to attack such that the mitigation techniques described herein can be employed. Such applications can include, by way of example and not limitation, Flash applications as well as others. Alternately or additionally, the mitigation embodiments described in this document can be implemented as a standalone component that works with or in connection with other applications.

In addition, environment 100 includes a network 112, such as the Internet, and one or more web sites 114. The web sites provide content, such as web pages and the like, for consumption by computing device 102.

Computing device 102 can be embodied as any suitable computing device such as, by way of example and not limitation, a desktop computer, a portable computer, a handheld computer such as a personal digital assistants (PDA), cell phone, and the like.

Having discussed an example operating environment, consider now a discussion of an example mitigation component and how the component can be utilized in accordance with one or more embodiments.

Example Mitigation Component

Figure 2:
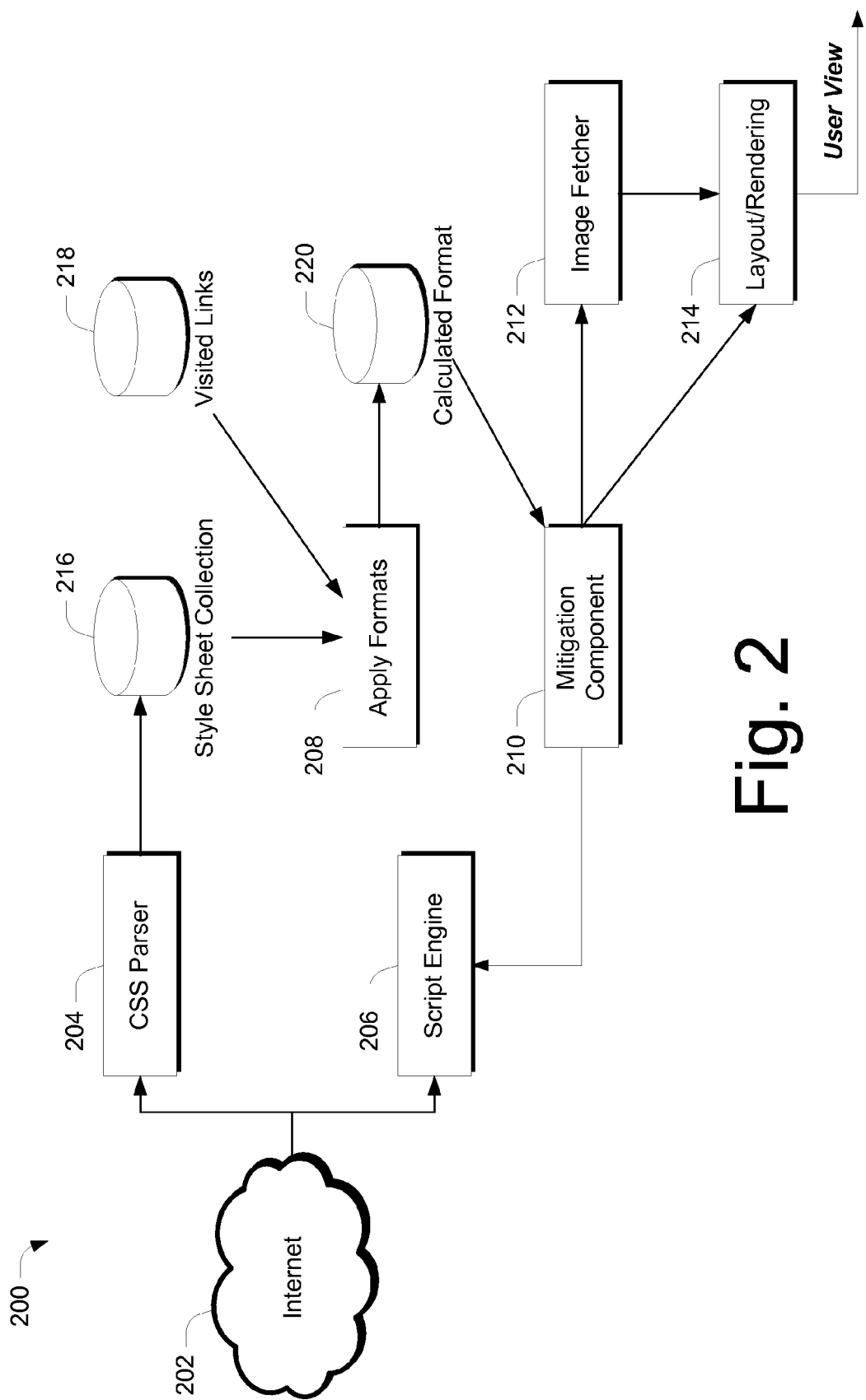
FIG. 2 is a data flow diagram in accordance with one or more embodiments.

FIG. 2 illustrates a data flow diagram having various components in accordance with one or more embodiments, generally at 200. In the illustrated and described embodiment, diagram 200 includes a network such as the Internet 202 and various components that may or may not comprise part of a web browser. These other components include, by way of example and not limitation, a CSS parser 204, a script engine 206, and apply formats component 208, a mitigation component 210, an image fetcher component 212, and a layout/rendering component 214. In addition, diagram 200 includes various data stores such as a style sheet collection store 216, a visited links store 218, and a calculated format store 220.

In accordance with one or more embodiments, when a web document such as a webpage is received from a network such as Internet 202, CSS parser 204 parses the web document and identifies any style sheet references contained in the document. As a simple example, the following excerpt might be received as an input to the CSS parser 204:

```
BODY { background-image: url(remoteResource.gif); }
DIV {
    background-image: inherit;
    color: purple;
}
```

The CSS parser then builds appropriate style sheets and provides the style sheets into style sheet collection store 216. In addition, script engine 206 receives executable script that is contained in or referenced by the web document. The script engine provides an environment in which the script can be executed.

The collection of style sheets in store 216 is used by the apply formats component 208, which is responsible for processing style sheets and deciding what a particular element is going to look like, both structurally and visually. In addition, the apply formats component 208 is also responsible for determining whether there are any environmental impacts associated with the style sheets. Environmental impacts can include those impacts that structurally affect an element or the web page in some way, as will become apparent below.

In addition, one of the inputs to the apply formats component 208 is information received from visited links store 218 which pertains to links that a user has visited. Recall that the links that a user has visited in the past comprises personally identifiable information.

In one or more embodiments, once the apply formats component 208 receives its input from both the style sheet collection store 216 and the visited links store 218, it produces what is known as a calculated format which is stored in calculated format store 220. In the illustrated and described embodiment, the calculated format represents a final structure that describes an overall format of an element (such as a link) being presented and thus contains all formatting rules for that element. The calculated format can contain information inherited from a parent scope or gained through some indirect mechanisms such as the style or behavior being attached. For example, using the excerpt provided above, a sample calculated format would appear as follows:

```
background-image: url(remoteResource.gif);
color: purple;
```

As can be appreciated, at this point, the calculated format may impact personally identifiable information because of the nature of the information contained in the calculated format, e.g. whether or not a particular link has been visited. Further, personally identifiable information may be impacted because the calculated format might contain information that results in an image fetch operation by image fetcher component 212. In the present example, a background image is referenced that would result in a remote image fetch operation. Further, in the past, the calculated format was available to (i.e. readable by) script executing in script engine 206, thus providing another potential source for divulging personally identifiable information.

In the illustrated and described embodiment, however, mitigation component 210 is utilized to sever, in a sense, a direct connection between script access to the calculated format, as well as a direct connection between the calculated format and image fetcher component 212.

In one example implementation, when the apply formats component 208 produces the calculated format, it includes along with various formatting information that is typically included, an indication as to whether the calculated format might impact personally identifiable information. To ascertain whether the calculated format might impact personally identifiable information, the apply formats component 208 can look to ascertain whether and how the above-mentioned pseudo-classes are utilized in the style sheets received from style sheet collection store 216. Thus, the apply formats component 208 can look to ascertain whether any style sheets carry with them structural formatting information which would change the structure of a web document. If there is structural formatting information which would affect the structure of the web document, the apply formats component 208 can provide the above-mentioned indication in the calculated format.

Any suitable mechanism can be used to provide an indication as to whether the calculated format might impact personally identifiable information. For example, in at least some embodiments, a bit flag can be set to indicate that personally identifiable information might be impacted by the calculated format.

When the mitigation component 210 receives the calculated format, it checks to see whether the bit flag is set to indicate that personally identifiable information might be impacted. If the bit flag is not set, then the mitigation described below can be skipped and further processing can take place, such as providing the calculated format to the layout/rendering component 214 for building a user view. If, on the other hand, the bit flag is set, a mitigation process is initiated.

In one or more embodiments, the mitigation process can be defined as a policy that is embodied by a list, such as a white list of acceptable pseudo-class properties including, by way of example and not limitation, color, background color and text decoration. That is, the list of acceptable properties can include those properties that are associated with visual formatting and not structural formatting. By implication then, the white list excludes certain properties which are directed to structural formatting. These structural formatting properties can include, by way of example and not limitation, padding properties (which change the size of elements within a web document), background image properties (which would require an image fetch), other image properties which would require an image fetch, and the like. Further, such structural formatting properties can include location and sizing affecting properties such as top, left, bottom, right in combination with properties such as position: absolute and position: relative. Thus, in this embodiment, properties that appear on the white list of acceptable properties are applied, and those that do not appear on the white list are not applied. In this manner, the mitigation component can enable particular CSS pseudo-classes to be employed in a somewhat limited capacity that is designed to protect personally identifiable information. In turn, content authors are still free to employ these pseudo-classes, but their functionality is modified as described above and below.

Accordingly, what is produced by the mitigation component is a what can be consider as a sanitized version of the calculated format resulting in a format in which properties that result in visual format changes are allowed to be applied, and properties that would result in structural formatting changes are not allowed to be applied. In some embodiments, problematic properties associated with the calculated format can be physically removed to provide the sanitized calculated format. Alternately or additionally, problematic properties associated with the calculated format might be retained in the calculated format along with a policy that limits application of the problematic properties to thus provide a sanitized calculated format. Such might be the case, for example, in a situation where document editing software might use the problematic properties internally, yet be limited in their use by a particular policy, such as disallowing remote image fetching. As an example of the former, consider the excerpt just below which provides a sanitized calculated format using the excerpts referenced above:

color: purple;

This sanitized version of the calculated format can then serve to provide input, where appropriate, to script engine 206, image fetcher component 212, and layout/rendering component 214.

Specifically, if script executing in script engine 206 makes a request or attempts to read the calculated format, it receives, from mitigation component 210 a sanitized format that does not include properties that have been excluded above. Similarly, image fetcher component 212 can still be called upon to fetch images that appear in a sanitized request. However, such images would be those that pertain to or are associated with something other than the pseudo-classes mentioned above. This would allow other types of CSS rendering or layout operations to be performed. For example, image fetches and various forms of layout changing formats can be allowed when the links refer to locations within a current document. These references are known as fragment identifiers and are used in self referential navigation. An example would be a single HTML page which represents a book in which each chapter is linked to from a table of contents or TOC.

Thus, in one or more embodiments, the mitigation component 210 can also allow so-called fragment identifiers to be used to link within the same page. That is, when fragment identifiers are used to link within the same page, an assumption is made that the author of the content is also a target author. Thus, in these embodiments, full ":visited" access is provided if a URL points within the same page, for example, in the case of bookmarks.

Example Methods

Figure 3:
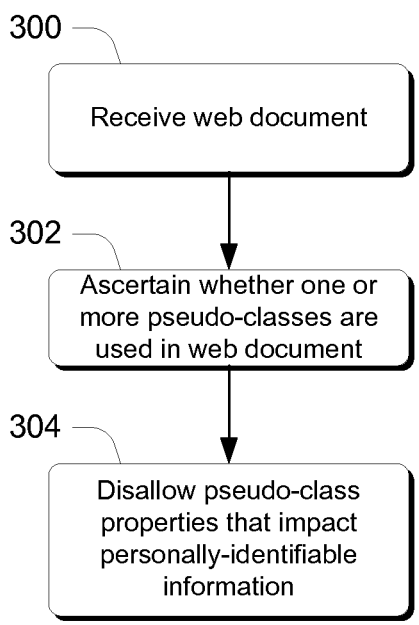
FIG. 3 is a flow diagram that describes steps in a method in accordance with one or more embodiments.

FIG. 3 is a flow diagram that describes steps a method in accordance with one or more embodiments. The method can be implemented in connection with any suitable hardware, software, firmware, or combination thereof. In at least some embodiments, aspects of the method can be implemented by a suitably configured web browser. It is to be appreciated and understood, however, that aspects of the described method need not necessarily be implemented by a web browser.

Step 300 receives a web document. This step can be performed in any suitable way examples of which are described above. Step 302 ascertains whether one or more pseudo-classes are used in the web document. Examples of pseudo-classes are provided above. Step 304 disallows one or more pseudo-class properties that impact personally-identifiable information. Examples of pseudo-classes and pseudo-class properties that can impact personally-identifiable information are provided above. For example, pseudo-class properties that cause structural changes in a web document can impact personally-identifiable information. Alternately or additionally, pseudo-class properties that cause one or more images to be fetched from a server can impact personally-identifiable information. Thus, these properties can be disallowed by not applying them relative to a particular web document. Examples of how properties can be disallowed are provided above.

Figure 4:
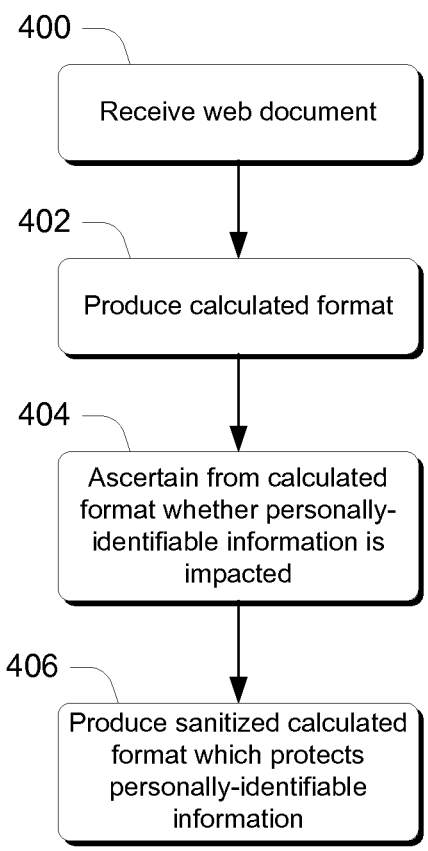
FIG. 4 is a flow diagram that describes steps in a method in accordance with one or more embodiments.

FIG. 4 is a flow diagram that describes steps a method in accordance with one or more embodiments. The method can be implemented in connection with any suitable hardware, software, firmware, or combination thereof. In at least some embodiments, aspects of the method can be implemented by a suitably configured web browser. It is to be appreciated and understood, however, that aspects of the described method need not necessarily be implemented by a web browser.

Step 400 receives a web document and step 402 produces, from the web document, a calculated format. Examples of a calculated format are provided above. Step 404 ascertains, from the calculated format, whether personally-identifiable information is impacted. Such can include, in at least some embodiments, identifying whether particular pseudo-classes are used in a style sheet associated with the web document. Specific examples of pseudo-classes are given above. Step 406 produces, from the calculated format, a sanitized calculated format which protects personally-identifiable information. The sanitized calculated format can be considered, in at least some embodiments, as one in which certain problematic pseudo-class properties are not applied. Examples of those properties and ways in which the properties are not applied are given above.

The sanitized calculated format can now serve as a basis for input to other processes associated with the web document. By serving as a basis for input to these processes, personally-identifiable information can be protected. For example, executing script that may attempt to read information associated with the calculated format will now receive sanitized format in which personally-identifiable information has been protected. Alternately or additionally, image fetching operations can now be conducted using the sanitized format, thus protecting personally-identifiable information. Further, sanitized formatting information can now serve as a basis for layout and rendering operations, thus protecting personally-identifiable information.

Example System

Figure 5:
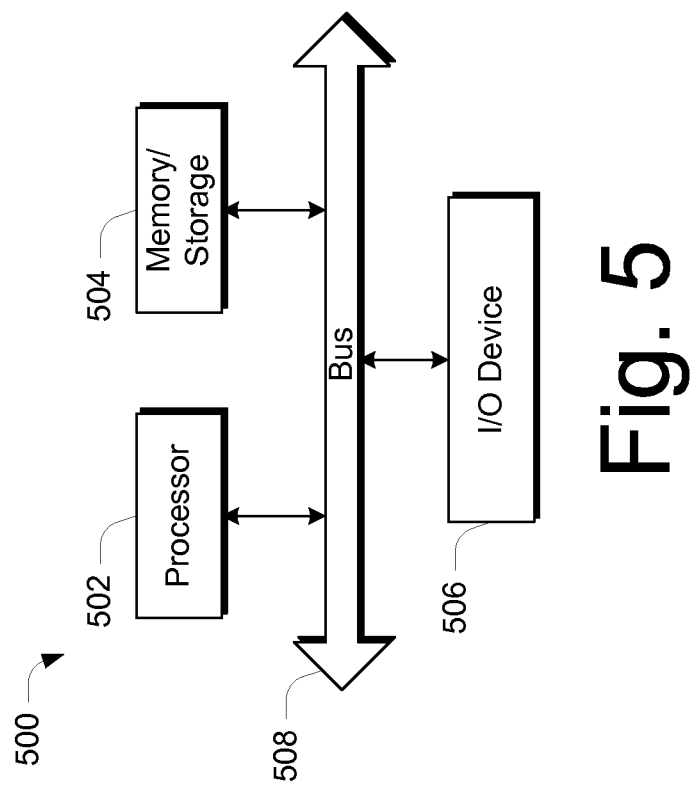
FIG. 5 illustrates an example system that can be used to implement one or more embodiments.

FIG. 5 illustrates an example computing device 500 that can implement the various embodiments described above. Computing device 500 can be, for example, computing device 102 of FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments enable particular CSS pseudo-classes to be employed, but limit particular functionality aspects of those pseudo-classes that can lead to divulging personally identifiable information. Thus, various embodiments can change how a CSS pseudo-class is allowed to function. For example, in at least some embodiments, CSS pseudo-classes are permitted to be used to make the visual formatting changes to a web page, but not structural formatting changes. That is, changes that do not affect the structure of content within a web document are allowed, while changes that affect the structure of the content are not allowed.

In various embodiments, script access to formatting information that might impact personally-identifiable information can be blocked. Alternately or additionally, image-fetching operations from which personally-identifiable information can be inferred can be blocked. Alternately or additionally, mitigation techniques can be employed that maintain code path times so that examination of mitigation activities versus the absence of mitigation activities cannot be inferentially used to ascertain personally-identifiable information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, at a computing device, a web document having at least one element that when formatted according to styles associated with the web document is capable of impacting personally-identifiable information of a user of the computing device;
producing, from the web document, a calculated format that describes element formats;
ascertaining, from the calculated format that was produced by the producing, that the personally-identifiable information of the user of the computing device might be impacted by formatting the at least one element; and
producing, from the calculated format, a sanitized calculated format that sanitizes the at least one element to prevent the personally-identifiable information of the user of the computing device from being impacted.

2. The method of claim 1, wherein said producing the calculated format comprises severing connections between script access to the calculated format and connections between the calculated format and an image fetcher component.

3. One or more hardware computer-readable memories storing computer-readable instructions that are executable by a computing device to perform operations comprising:
receiving, at the computing device, a web document having at least one element that when formatted according to styles associated with the web document is capable of impacting personally-identifiable information of a user of the computing device;
producing, from the web document, a calculated format that describes element formats;
ascertaining, from the calculated format that was produced by the producing, that the personally-identifiable information of the user of the computing device might be impacted by formatting the at least one element; and
producing, from the calculated format, a sanitized calculated format that sanitizes the at least one element to prevent the personally-identifiable information of the user of the computing device from being impacted.

4. The one or more hardware computer readable memories of claim 3, wherein said ascertaining comprises identifying whether particular pseudo-classes are used in a style sheet associated with the web document.

5. The one or more hardware computer readable memories of claim 3, wherein said ascertaining comprises identifying whether particular pseudo-classes are used in a style sheet associated with the web document, wherein one pseudo-class comprises a ":link" pseudo-class.

6. The one or more hardware computer readable memories of claim 3, wherein said ascertaining comprises identifying whether particular pseudo-classes are used in a style sheet associated with the web document, wherein one pseudo-class comprises a ":visited" pseudo-class.

7. The one or more hardware computer readable memories of claim 3, wherein personally-identifiable information can be impacted by an image fetch operation to a remote source.

8. The one or more hardware computer readable memories of claim 3, wherein said ascertaining comprises ascertaining whether the calculated format includes structural formatting information.

9. The one or more hardware computer readable memories of claim 3, wherein said ascertaining comprises ascertaining whether the calculated format includes structural formatting information, wherein said producing produces a sanitized calculated format in which one or more structural changes described in the calculated format are not allowed.

10. The one or more hardware computer readable memories of claim 3, wherein personally-identifiable information can be impacted if the calculated format contains information that describes links visited by the user.

11. The one or more hardware computer readable memories of claim 3, wherein said ascertaining comprises ascertaining whether the calculated information contains one or more pseudo-class properties other than acceptable properties.

12. The one or more hardware computer readable memories of claim 3, wherein said ascertaining comprises ascertaining whether the calculated format contains one or more pseudo-class properties other than acceptable properties, wherein acceptable properties can include properties associated with color, background color and text decoration.

13. A computing device comprising:
one or more hardware computer-readable memories;
computer-readable instructions stored on the one or more hardware computer readable memories which, when executed, provide:
a web browser of the computing device; and
a mitigation component utilized by the web browser to perform operations at the computing device comprising:
receiving a web document having a style sheet that is associated with the web document, wherein the web document includes at least one element that when formatted according to pseudo-classes used by the style sheet is capable of impacting personally-identifiable information of a user of the computing device;
producing, from the web document and the style sheet, a calculated format that describes element formats;
ascertaining from the calculated format that the personally-identifiable information of the user of the computing device might be impacted by formatting the at least one element according to the pseudo-classes used by the style sheet that affect the web document's structural format; and
producing, from the calculated format, a sanitized calculated format to protect the personally-identifiable information of the user in which the at least one element is not allowed to be formatted according to the pseudo-classes that affect the web document's structural format.

14. The computing device of claim 13, wherein the operations further comprise identifying whether the pseudo-classes used by the style sheet include a ":link" pseudo-class.

15. The computing device of claim 13, wherein the operations further comprise identifying whether the pseudo-classes used by the style sheet include a ":visited" pseudo-class.

16. The computing device of claim 13, wherein the operations further comprise producing the sanitized calculated format without using image fetch operations to a remote source that impact personally-identifiable information.

17. The computing device of claim 13, wherein the operations further comprise severing connections between script access to the calculated format and connections between the calculated format and an image fetcher component.

18. The computing device of claim 13, wherein the pseudo-classes used by the style sheet comprise a pseudo-class that applies to links that have not been visited by a user and a pseudo-class that applies to links that have been visited by a user, and wherein the operations further comprise producing the sanitized calculated format without using properties of the pseudo-class that applies to links that have been visited that impact personally identifiable information.

19. The computing device of claim 13, wherein the operations further comprise producing the sanitized calculated format using pseudo-class properties that are associated with color, background color and text decoration.

\* \* \* \* \*